US011919743B2

(12) United States Patent
Darnley, III et al.

(10) Patent No.: US 11,919,743 B2
(45) Date of Patent: Mar. 5, 2024

(54) GLASS ELEVATOR INNOVATIONS

(71) Applicant: NATIONWIDE LIFTS, Queensbury, NY (US)

(72) Inventors: Andrew Darnley, III, Fayetteville, NY (US); Susan Marie Siegmann, North Tonawanda, NY (US); Joseph Harlan Marshall, Auburn, NY (US); Jesse Scott Duncan, Liverpool, NY (US)

(73) Assignee: NATIONWIDE LIFTS, Queensbury, NY (US)

( * ) Notice: Subject to any disclaimer, the term of this patent is extended or adjusted under 35 U.S.C. 154(b) by 285 days.

(21) Appl. No.: 17/270,882

(22) PCT Filed: Sep. 27, 2019

(86) PCT No.: PCT/US2019/053375

§ 371 (c)(1),
(2) Date: Feb. 24, 2021

(87) PCT Pub. No.: WO2020/069265

PCT Pub. Date: Apr. 2, 2020

(65) Prior Publication Data

US 2021/0179388 A1 Jun. 17, 2021

Related U.S. Application Data

(60) Provisional application No. 62/737,198, filed on Sep. 27, 2018.

(51) Int. Cl.
*B66B 11/02* (2006.01)

(52) U.S. Cl.
CPC ...... *B66B 11/0226* (2013.01); *B66B 11/0206* (2013.01)

(58) Field of Classification Search
CPC . B66B 11/0226; B66B 7/024; B66B 11/0005; E04F 17/005
See application file for complete search history.

(56) References Cited

U.S. PATENT DOCUMENTS

| | | | | |
|---|---|---|---|---|
| 995,075 A * | 6/1911 | McDermott | E01B 9/66 | 238/282 |
| 1,707,720 A * | 4/1929 | Hepler | E01B 9/32 | 238/352 |
| 2,211,021 A * | 8/1940 | Mathias | E01B 13/02 | 238/338 |

(Continued)

FOREIGN PATENT DOCUMENTS

| | | | |
|---|---|---|---|
| CN | 202609734 U | * | 12/2012 |
| CN | 106044486 A | * | 10/2016 |

*Primary Examiner* — Michael A Riegelman
(74) *Attorney, Agent, or Firm* — C. Fred Charpie, III; Ward law Office LLC

(57) ABSTRACT

A floor for use with a glass elevator is provided. The floor includes an upper major surface, a lower major surface opposing the upper major surface, a first side edge, a second side edge, the first and second side edges extending from the upper major surface to the lower major surface. The floor includes one or more front edges and one or more rear edges. The one or more front edges and one or more rear edges extend from the upper major surface to the lower major surface. The floor is formed from a unitary, continuous, solid plate material.

16 Claims, 11 Drawing Sheets

(56) References Cited

U.S. PATENT DOCUMENTS

| | | | | | |
|---|---|---|---|---|---|
| 4,231,148 | A * | 11/1980 | Harding | E04F 17/005 | 29/469 |
| 4,986,041 | A * | 1/1991 | Prewer | E04F 17/005 | 52/270 |
| 5,644,871 | A * | 7/1997 | Cohen | E04B 5/04 | 52/125.4 |
| 6,371,249 | B1 * | 4/2002 | Schops | B66B 7/024 | 187/408 |
| 8,800,724 | B1 * | 8/2014 | Foster | B66B 19/00 | 187/414 |
| 10,221,045 | B2 * | 3/2019 | Hall | B66B 13/30 | |
| 2005/0105303 | A1 * | 5/2005 | Emde | B32B 17/10055 | 362/616 |
| 2007/0170013 | A1 * | 7/2007 | Rivera | B66B 7/024 | 187/408 |
| 2011/0266413 | A1 * | 11/2011 | Fritz | E04F 17/005 | 248/669 |
| 2017/0113899 | A1 * | 4/2017 | Hettema | B66B 9/00 | |
| 2018/0050887 | A1 * | 2/2018 | Hall | B66B 11/0226 | |
| 2018/0127242 | A1 * | 5/2018 | Witczak | B66B 11/0005 | |
| 2019/0367327 | A1 * | 12/2019 | Kallio | B66B 7/024 | |
| 2020/0115190 | A1 * | 4/2020 | Xiong | B66B 7/02 | |
| 2020/0217087 | A1 * | 7/2020 | Greschbach | B66B 11/0005 | |
| 2021/0179388 | A1 * | 6/2021 | Darnley, III | B66B 7/024 | |
| 2021/0269282 | A1 * | 9/2021 | Skovajsa | E04F 17/005 | |
| 2022/0024723 | A1 * | 1/2022 | Laitinen | B66B 19/00 | |
| 2022/0055862 | A1 * | 2/2022 | Wang | B66B 19/00 | |
| 2022/0274804 | A1 * | 9/2022 | Li | E04B 1/5831 | |

* cited by examiner

GLASS ELEVATOR INNOVATIONS

RELATED APPLICATIONS

This application claims priority from U.S. Provisional Patent Application No. 62/737,198, filed Sep. 27, 2018, the disclosure of which is incorporated herein by reference in its entirety.

BACKGROUND

Elevators designed for vertical transportation typically operate between vertically-oriented building floors and can be configured for both commercial and residential use.

Commercial and residential elevators often operate by moving an enclosure (typically referred to as a cab or car) along one or more guide rails using a cable or hydraulic lift system. The enclosure includes a floor, walls and a ceiling and defines a compartment for goods and/or passengers. The enclosure moves vertically along the guide rails within a hoistway.

In certain instances, the enclosure can be configured to provide visibility into and out of the enclosure. The visibility results from the use of transparent materials for floor, wall and ceiling elements, such as the non-limiting examples of acrylics and glass.

It would be advantageous if glass elevators could be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the innovations for glass elevators.

The above objects as well as other objects not specifically enumerated are achieved by a floor for use with a glass elevator. The floor includes an upper major surface, a lower major surface opposing the upper major surface, a first side edge, a second side edge, the first and second side edges extending from the upper major surface to the lower major surface. The floor includes one or more front edges and one or more rear edges. The one or more front edges and one or more rear edges extend from the upper major surface to the lower major surface. The floor is formed from a unitary, continuous, solid plate material.

The above objects as well as other objects not specifically enumerated are also achieved by a framework assembly for use with a glass elevator. The framework assembly includes a lower structural ring, an intermediate structural ring positioned vertically above the lower structural ring, a plurality of corner members extending from the lower structural ring to the intermediate structural ring and a plurality of guide rails extending from the lower structural ring to the intermediate structural ring. The lower and intermediate structural rings are each formed from a unitary, continuous, solid plate material.

The above objects as well as other objects not specifically enumerated are also achieved by a cladding member for use with glass elevator. The cladding member includes a first base portion and a first side portion extending from the first base portion. The cladding member also includes a second base portion opposing the first base portion and a second side portion extending from the second base portion. A top portion extends from the first side portion to the second side portion. A cavity is formed by the first and second base portions, first and second side portions and the top portion. The cavity is configured to receive a portion of a guide rail.

The above objects as well as other objects not specifically enumerated are also achieved by a method of cold forming a radiused bend in transparent materials for use with a glass elevator. The method includes the steps of selecting a punch for use in a press brake, the punch having a cross-sectional shape with a desired radius, selecting a die for use with the punch in the brake press, the die having cross-sectional shape that corresponds with the cross-sectional shape of the punch, the die having an opening configured to receive the punch, positioning a material on the die such that an intended bend line aligns with the cross-sectional shape of the die, urging the punch into contact with the material without the use of heat until the material seats against the die and forms a bend and urging the punch out of contact with the material. The die opening has a dimension in a range of from about 5 to 8 times a thickness of the transparent material.

Various objects and advantages of the innovations for glass elevators will become apparent to those skilled in the art from the following detailed description, when read in light of the accompanying drawings.

DETAILED DESCRIPTION

Figure 1:
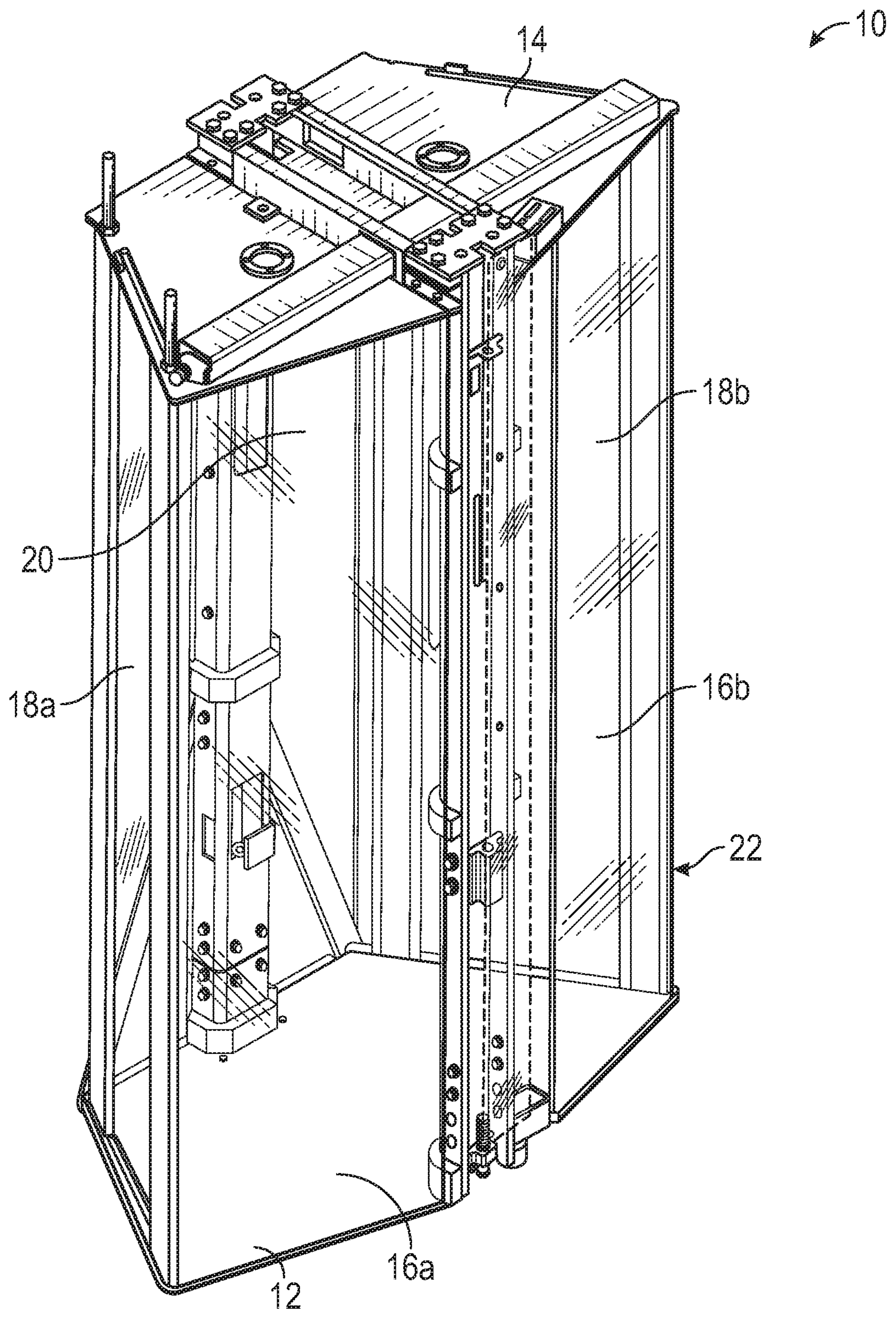
FIG. 1 is a perspective view of a glass elevator car.

The innovations for glass elevators (hereafter "glass elevator innovations") will now be described with occasional reference to the illustrated embodiments. The glass elevator innovations may, however, be embodied in different forms and should not be construed as limited to the embodiments set forth herein. Rather, these embodiments are provided so that this disclosure will be thorough and complete, and will fully convey the scope of the glass elevator innovations to those skilled in the art.

Unless otherwise defined, all technical and scientific terms used herein have the same meaning as commonly understood by one of ordinary skill in the art to which the glass elevator innovations belong. The terminology used in the description of the glass elevator innovations herein is for describing particular embodiments only and is not intended to be limiting of the glass elevator innovations. As used in the description of the glass elevator innovations and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the glass elevator innovations. Notwithstanding that the numerical ranges and parameters setting forth the broad scope of the glass elevator innovations are approximations, the numerical values set forth in the specific examples are reported as precisely as possible. Any numerical values, however, inherently contain certain errors necessarily resulting from error found in their respective measurements.

The description and figures disclose innovations for glass elevators. The innovations include a floor formed from unitary, continuous, solid plate material, a plurality of structural rings formed from a unitary, continuous, solid plate material, cladding members configured for attachment to guide rails and radiused bends formed in various car elements by cold forming processes.

The term "glass", as used herein, is defined to mean transparent materials, such as the non-limiting examples of transparent materials include polymeric materials, glass materials or any combination thereof. The use of the glass materials in elevator wall elements, floor elements or ceiling elements advantageously allows for visibility out of the elevator car or into the elevator car. The term "elevator", as used herein, is defined to mean any structure configured for vertical transportation, including the non-limiting examples of commercial elevators, residential elevators, service elevators, dumb-waiters, wheel-chair lifts, platform lifts, passenger elevators and the like.

Referring now to the drawings, there is illustrated in FIG. 1 a non-limiting example of a glass elevator car at 10. In the illustrated embodiment, the glass elevator car 10 is configured for a residential elevator. However, in other embodiments, the glass elevator car 10 can be configured for other types of elevators. The glass elevator car 10 is configured for guidance by one or more guide rails (not shown) and further configured for vertical travel within a hoistway (not shown). The glass elevator car 10 includes a floor element 12, a ceiling element 14, a plurality of front wall elements 16*a*, 16*b*, opposing sidewall elements 18*a*, 18*b* and a rear wall element 20. The floor element 12, ceiling element 14, front wall elements 16*a*, 16*b*, opposing sidewall elements 18*a*, 18*b* and the rear wall element 20 are connected together by elements of a framework assembly 22. The framework assembly 22 will be discussed in more detail below.

To facilitate visibility into and out of the interior of the glass elevator car 10, portions of the front wall elements 16*a*, 16*b*, opposing sidewall elements 18*a*, 18*b* and the rear wall element 20 can be formed from transparent materials.

Figure 2:
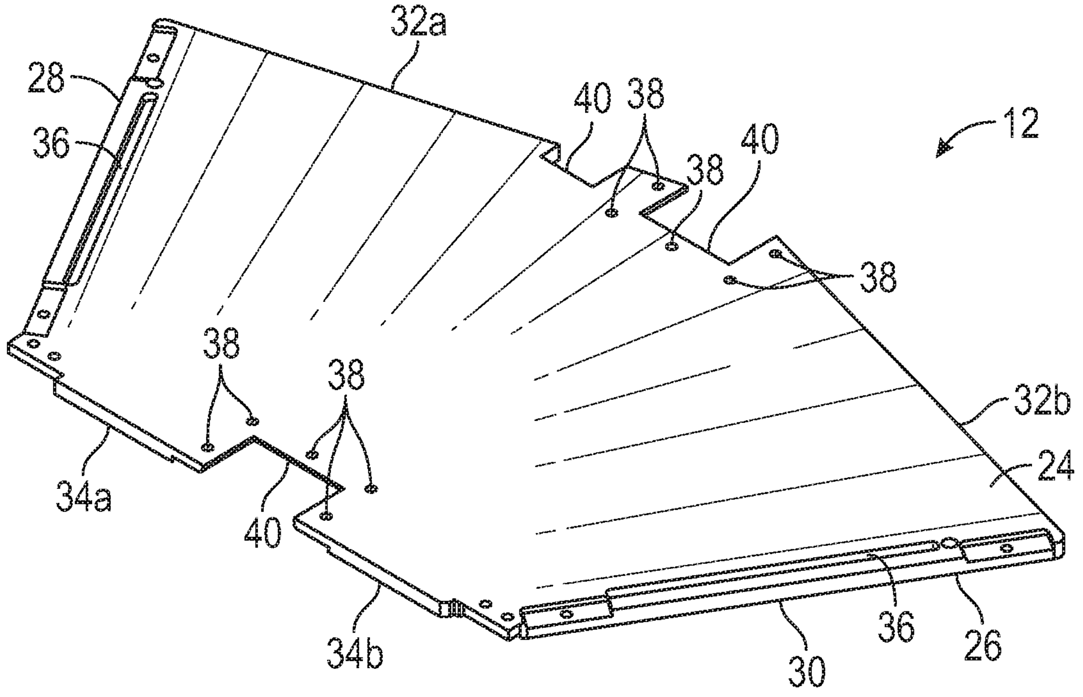
FIG. 2 is a perspective view of a first embodiment of a floor of the glass elevator car of FIG. 1.

Referring now to FIG. 2, a first embodiment of the floor element 12 is illustrated. The floor element 12 includes a major upper surface 24 and a major lower surface 26. The floor element 12 further includes a first side edge 28, a second side edge 30, a first front edge 32*a*, a second front edge 32*b*, a first rear edge 34*a* and a second rear edge 34*b*. The floor element 12 can include a plurality of first recesses 36 arranged to be adjacent and parallel to the first and second side edges 28, 30. The recesses 36 are configured as guides for the cab gate (not shown). The floor element 12 can include a plurality of apertures 38 for attaching cab walls, and second recesses 40 configured to receive cab sling attachments (not shown). The floor element 12 is formed from unitary, continuous, solid plate material, such as the non-limiting examples of aluminum plate or reinforced fiberglass plate. The unitary, continuous, solid plate provides the required strength, while maintaining a low profile and a low weight. Prior to machining, the floor element 12 has a rectangular shape.

Referring again to FIG. 2, forming the floor element 12 from a unitary, continuous, solid plate material provides many benefits, although all benefits may not be present in all embodiments. First, forming the floor element 12 from unitary, continuous, solid plate material facilitates a pitless elevator hoistway structure, thereby requiring a distance of only 0.75 inches of step into the glass elevator car 10. Second, the floor element 12 formed from unitary, continuous, solid plate material facilitates a shallow pit hoistway structure, thereby resulting in no step up distance into the glass elevator car 10. Third, the floor element 12 formed from unitary, continuous, solid plate material facilitates the manufacture of any shape or size of floor element 12. Fourth, the floor element 12 formed from unitary, continuous, solid plate material facilitates incorporation of the sill and gate track into the floor element 12, thereby providing an efficient manufacturing process. Fifth, the floor element 12 formed from unitary, continuous, solid plate material facilitates a simpler manufacturing process as welding steps are no longer needed. Sixth, the floor element 12 formed from unitary, continuous, solid plate material provides a corrosion-resistant material. Finally, the floor element 12 formed from unitary, continuous, solid plate material provides an aesthetically pleasing sleek and modern appearance.

Figure 3:
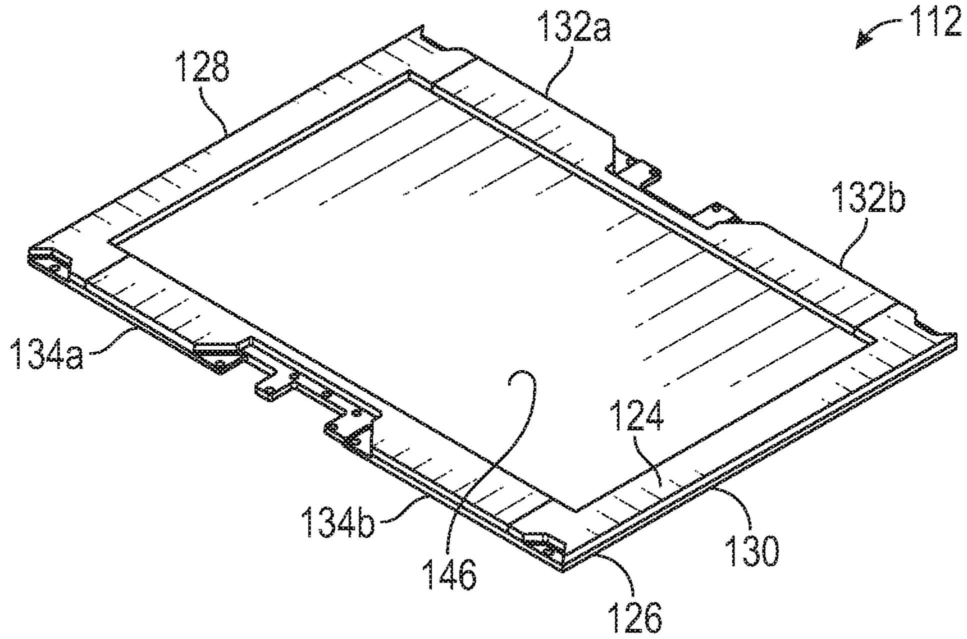
FIG. 3 is a perspective view of a second embodiment of a floor of the glass elevator car of FIG. 1.

Referring now to FIG. 3, a second embodiment of the floor element 112 is illustrated. The floor element 112 includes a major upper surface 124, a major lower surface 126, a first side edge 128, a second side edge 130, a first front edge 132*a*, a second front edge 132*b*, a first rear edge 134*a* and a second rear edge 134*b*. In the illustrated embodiment, the major upper surface 124, major lower surface 126, first side edge 128, second side edge 130, first front edge 132*a*, second front edge 132*b*, first rear edge 134*a* and second rear edge 134*b* are the same as, or similar to, the major upper surface 24, major lower surface 26, first side edge 28, second side edge 30, first front edge 32*a*, second front edge 32*b*, first rear edge 34*a* and second rear edge 34*b* shown in FIG. 2 and described above with the exception that the first major surface 124 includes a recess 146. The recess 146 is arranged to abut the edges 128, 130, 132*a*, 132*b*, 134*a* and 134*b*. The recess 146 is configured to receive flooring (not shown). The flooring can have any decorative or functional form and the recess 146 can have any depth, shape or size sufficient to receive the flooring.

Referring again to FIG. 3, in a manner similar to the floor element 12, the floor element 112 is formed from unitary, continuous, solid plate material and is configured to provide the same benefits as described above for the floor element 12.

Figure 4:
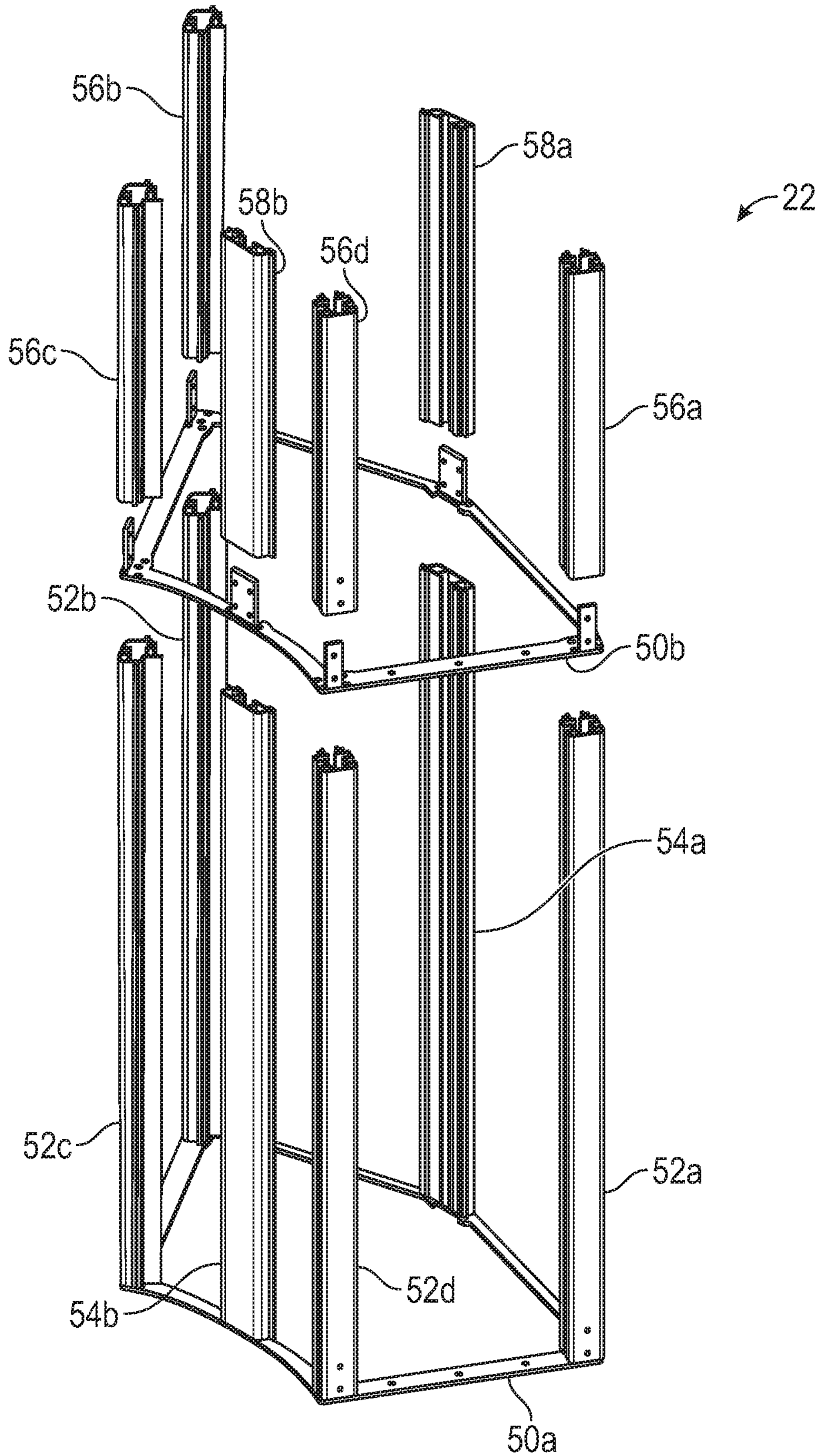
FIG. 4 is a perspective view of a framework assembly for an elevator hoistway of the glass elevator car of FIG. 1.

Referring now to FIG. 4, the framework assembly 22 is illustrated in an exploded view. When assembled, as shown in FIG. 1, the framework assembly 22 provides a supporting structure within which the residential elevator car 10 travels. The framework assembly 22 includes a lower structural ring 50*a*, an intermediate structural ring 50*b* and an upper structural ring (not shown for purposes of clarity). The lower and intermediate structural rings 50*a*, 50*b* are connected to a plurality of substantially vertical corner members 52*a*-52*d* and also connected to a plurality of guide rails 54*a*, 54*b*. The intermediate and upper structural rings 50*a* are connected to a plurality of substantially vertical corner members 56*a*-56*d* and also connected to a plurality of guide rails 58*a*, 58*b*.

Figure 5A:
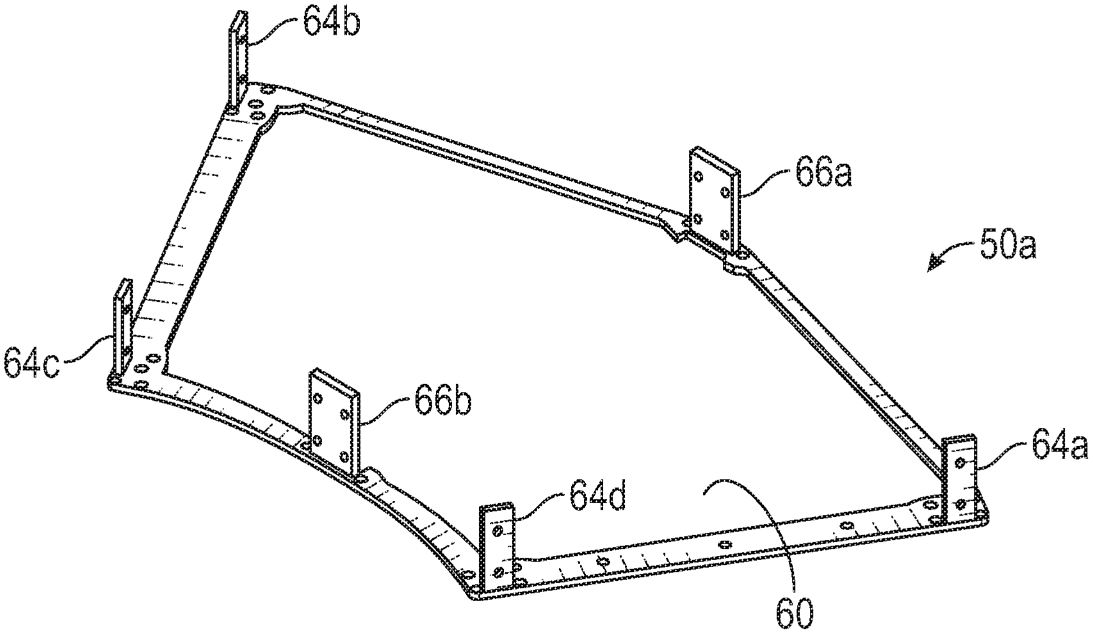
FIG. 5A is a perspective view of a structural ring of the framework assembly of FIG. 4.
Figure 5B:
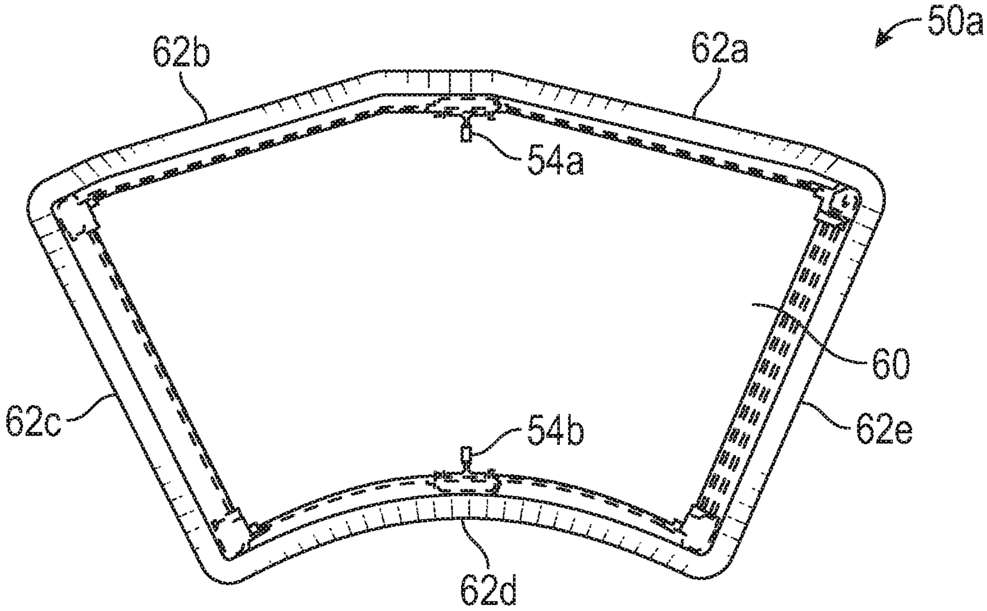
FIG. 5B is a plan view of a structural ring of the framework assembly of FIG. 4.

Referring now to FIGS. 5A and 5B, the lower structural ring 50*a* is illustrated. The lower structural ring 50*a* is representative of the intermediate structural ring 50*b*. The lower structural ring 50*a* includes an aperture 60 bounded by a plurality of perimeter segments 62*a*-62*e*. The perimeter segments 62*a*-62*e* and the aperture 60 cooperate to allow passage of the residential elevator car 10 therethrough. In the illustrated embodiment, the perimeter segments 62*a*-62*e* cooperate to form the five-sided lower structural ring 50*a*. However, it should be appreciated that in other embodiments, more or less than five perimeter segments can be used and the resulting structural ring can have other shapes and configurations.

Referring again to FIGS. 5A and 5B, the lower structural ring 50*a* includes a plurality of corner tabs 64*a*-64*d* and a plurality of intermediate tabs 66*a*, 66*b*. The plurality of corner tabs 64*a*-64*d* extend in a direction perpendicular to a plane formed by the perimeter segments 62*a*-62*e* and are configured to receive the corner members 52*a*-52*d*. The plurality of intermediate tabs 66*a*, 66*b* extend in a direction perpendicular to a plane formed by the perimeter segments 62*a*-62*e* and are configured to receive the guide rails 54*a*, 54*b*.

Referring again to the embodiment shown in FIGS. 4, 5A and 5B, the lower structural ring 50*a* is formed from a unitary, continuous, solid plate material, such as the non-limiting examples of unitary steel plate or unitary aluminum plate. The unitary, continuous, solid plate material is configured to provide structural strength while maintaining a low aesthetic profile, and allows the creation of complex custom shapes. The lower, intermediate and upper structural rings 50*a*, 50*b* can have a thickness in a range of from about 0.375 inches to about 0.75 inches. In certain instances, the lower, intermediate and upper structural rings 50*a*, 50*b* are formed using CNC-style plasma-based or laser-based cutting apparatus. However, it is contemplated that other methods can be used to form the lower, intermediate and upper structural rings 50*a*, 50*b* from unitary, continuous, solid plate material.

Referring now to FIGS. 4, 5A and 5B, the lower, intermediate and upper structural rings 50*a*, 50*b*, formed from unitary, continuous, solid plate material provides many benefits, although all benefits may not be present in all embodiments. First, the lower, intermediate and upper structural rings 50*a*, 50*b*, formed from unitary, continuous, solid plate material facilitate easy creation of custom structural ring shapes and sizes, including the non-limiting examples of non-square, non-rectangular, non-circular and non-ovular shapes. Second, the lower, intermediate and upper structural rings 50*a*, 50*b*, formed from unitary, continuous, solid plate material facilitate easy and fast construction of the framework assembly 22. Finally, the lower, intermediate and upper structural rings 50*a*, 50*b*, formed from unitary, continuous, solid plate material facilitate building of the framework assembly 22 in small and/or limited hoistway spaces.

Figure 6:
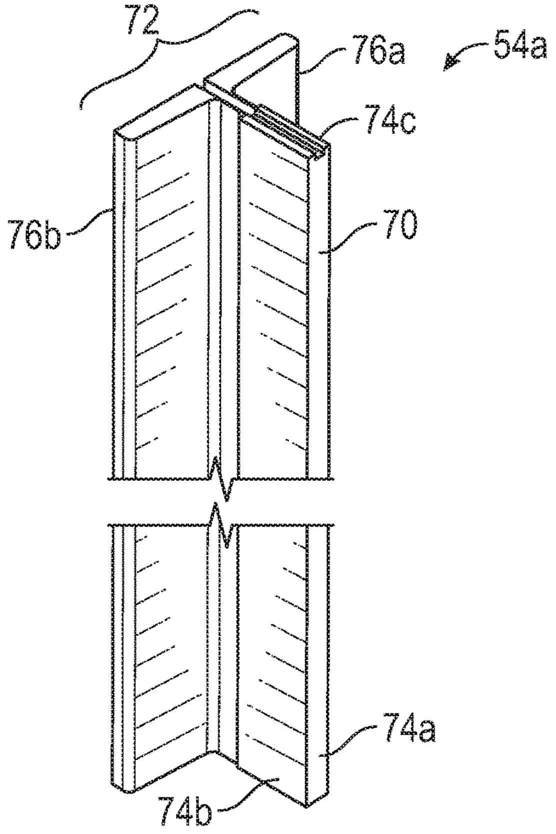
FIG. 6 is a perspective view of a guide rail of the framework assembly of FIG. 4.
Figure 7:
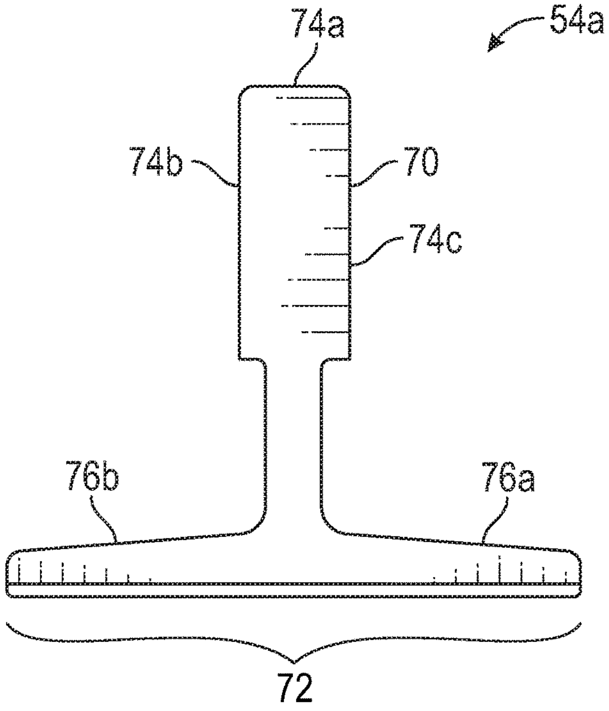
FIG. 7 is a plan view of a guide rail of the framework assembly of FIG. 4.

Referring now to FIGS. 6 and 7, a non-limiting example of a guide rail 54*a* is illustrated. The guide rail 54*a* is representative of the guide rails 54*b*, 58*a* and 58*b*. The guide rail 54*a* has an inverted "T" cross-sectional shape and includes a guiding web 70 extending from a base 72. The guiding web 70 includes a front face 74*a* positioned between opposing side faces 74*b*, 74*c*. The base 72 includes opposing flanges 76*a*, 76*b*. In operation, the glass elevator car 10 rolls or slides against the face 74*a* of the guide rails 54*a* as the glass elevator car 10 moves within the framework assembly 22.

Figure 8:
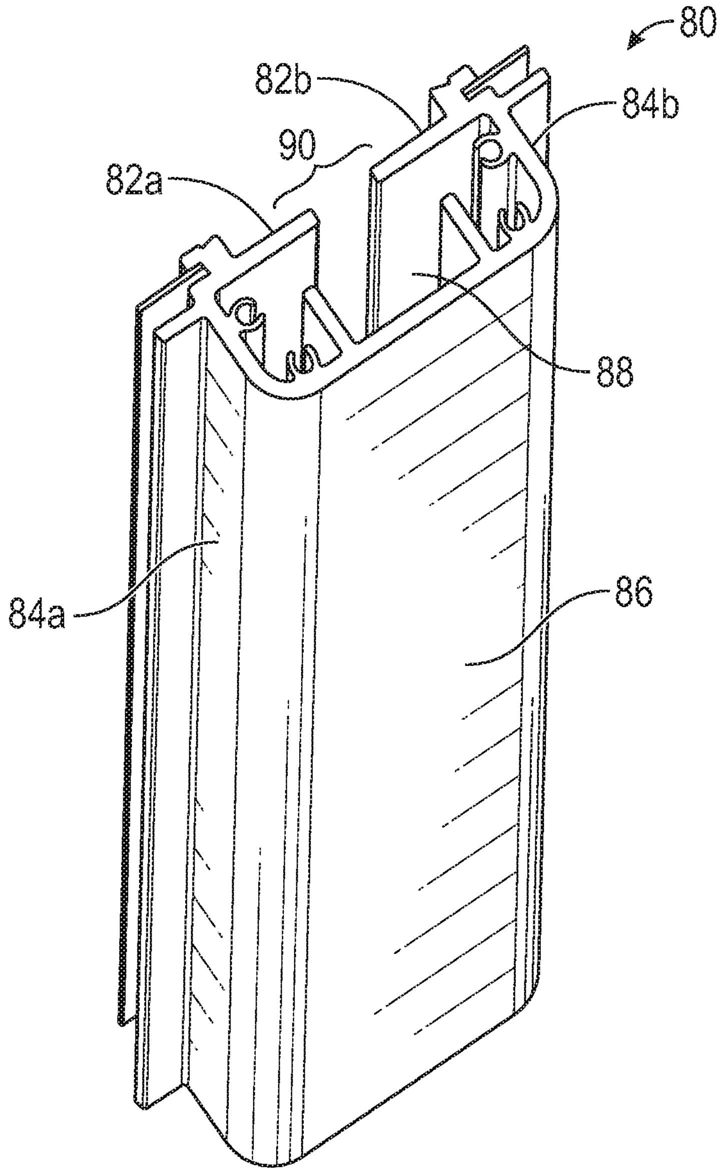
FIG. 8 is a perspective view of a cladding member for use with the framework assembly of FIG. 4.

Referring now to FIG. 8, a cladding member 80 is illustrated. The cladding member 80 includes a first base portion 82*a* and a first side portion 84*a* extending from the first base portion 82*a*. In a similar manner, a second side portion 84*b* extends from a second base portion 82*b*. A top portion 86 connects the first and second side portions 84*a*, 84*b*. The first and second base portions 82*a*, 82*b*, first and second side portions 84*a*, 84*b* and the top portion 86 cooperate to form a cavity 88 therebetween. The cavity 88 extends a length of the cladding member 80 and has a rectangular cross-sectional shape. The first and second base portions 82*a*, 82*b* are spaced apart such as to form a slot 90 therebetween. The slot 90 extends the length of the cladding member 80.

Referring again to FIG. 8, the cladding member 80 is formed from a metallic material, such as for example, stainless steel. Alternatively, the cladding member 80 can be formed from other desired metallic materials, including the non-limiting examples of galvanized steel, aluminum, copper and brass.

Figure 9:
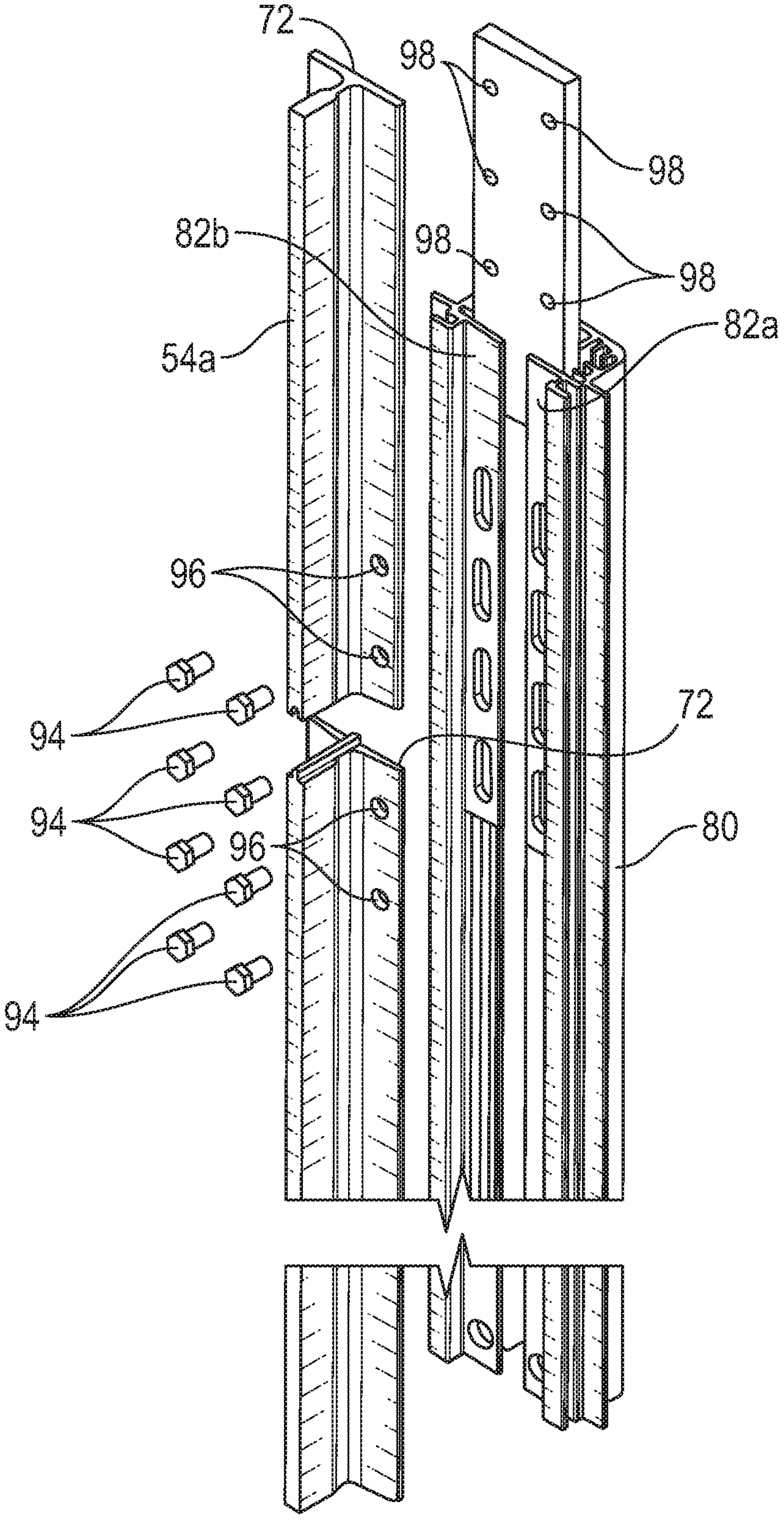
FIG. 9 is a perspective view of the guide rail of FIGS. 6 and 7 and the cladding member of FIG. 8, shown in a pre-assembled orientation.
Figure 10:
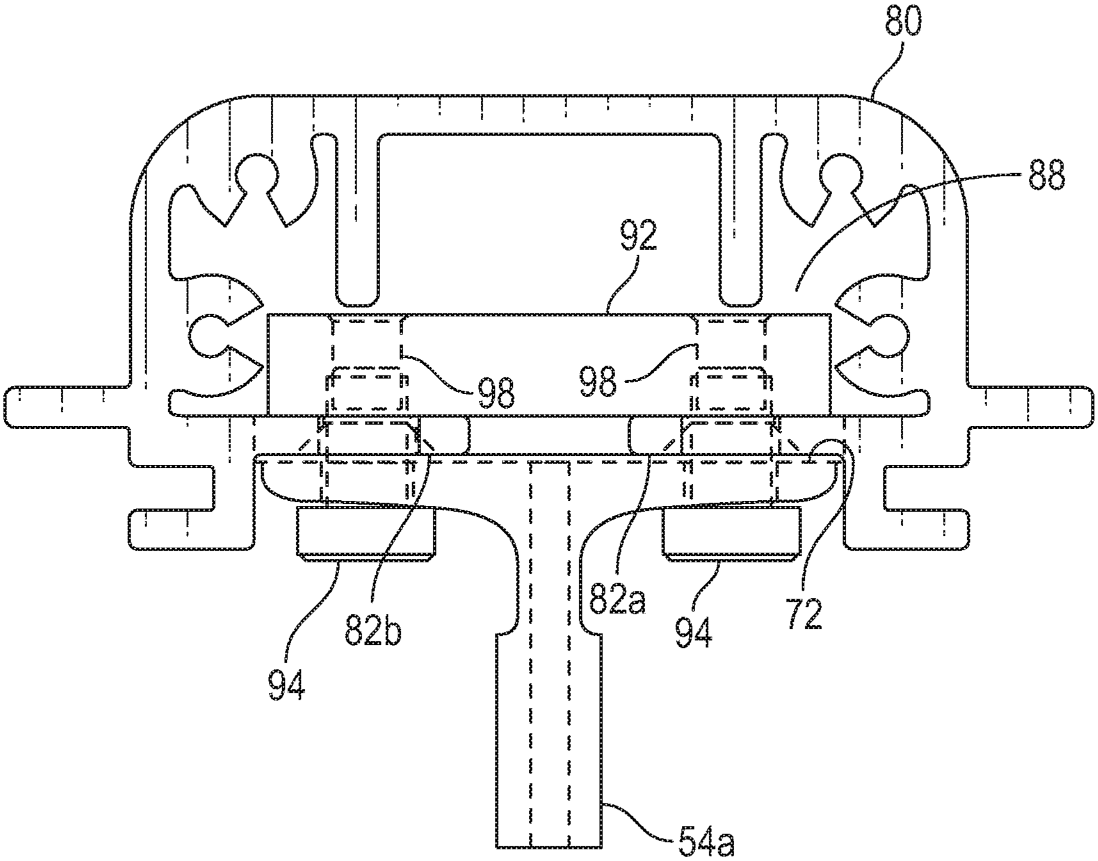
FIG. 10 is a plan view of the guide rail of FIGS. 6 and 7 and the cladding member of FIG. 8, shown in an assembled orientation.

Referring now to FIGS. 9 and 10, the cladding member 80 is attached to the guide rail 54*a* by sliding a connector member 92 (commonly called a fishplate) into the cavity 88. Next, a plurality of fasteners 94 are inserted into and through clearance apertures 96 in the guide rail 54*a* and into corresponding threaded apertures 98 located in the connector member 92. In the illustrated embodiment, the fasteners 94 are threaded bolts. However, in other embodiments, the fasteners 94 can be other structures, such as the non-limiting examples of clips or clamps.

Figure 11:
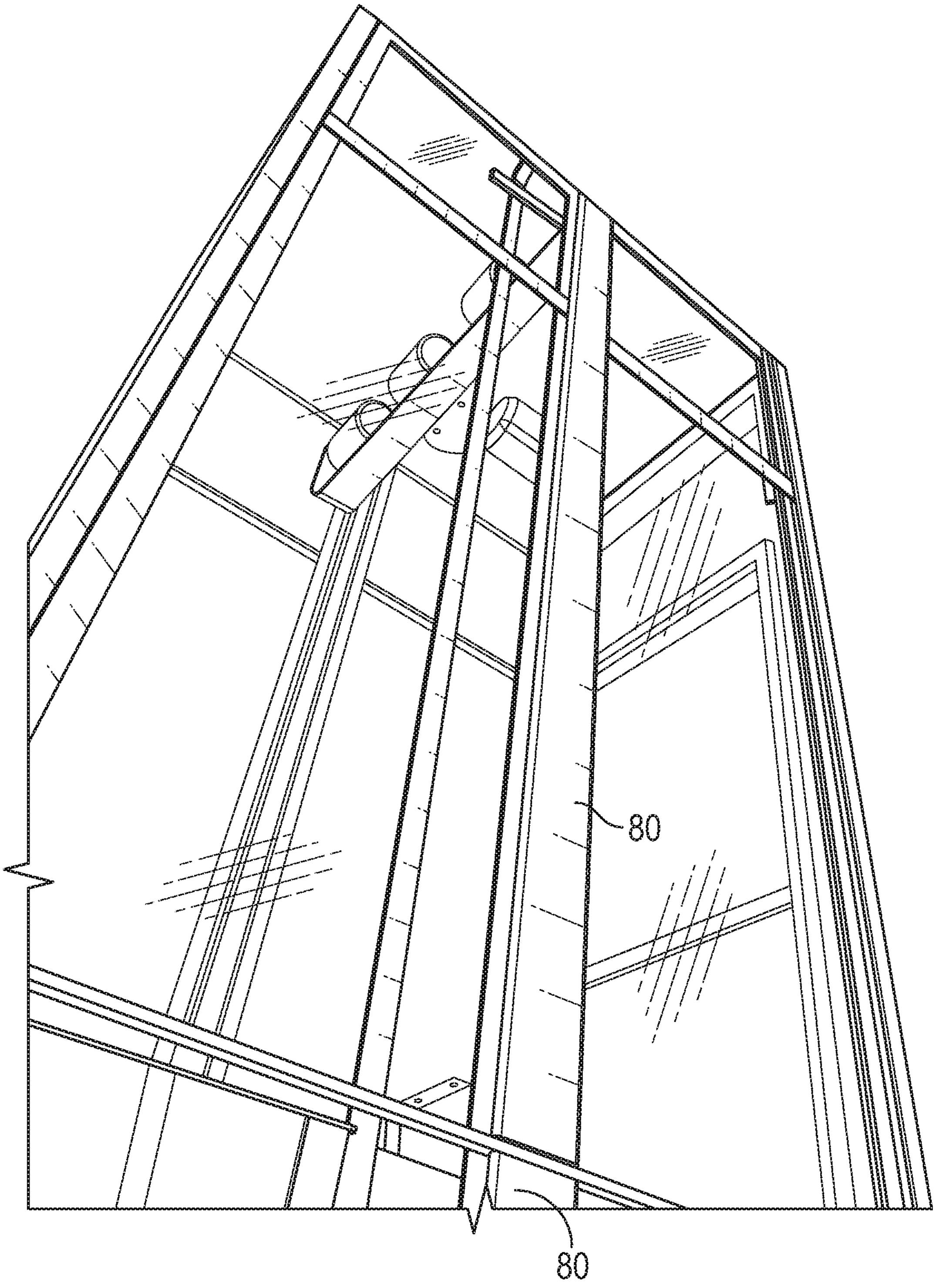
FIG. 11 is a perspective view of a framework assembly of FIG. 4 illustrating the installed cladding members of FIG. 8.

Referring again to FIGS. 9 and 10, the plurality of fasteners 94 are tightened until the base 72 of the guide rail 54*a* seats against the first and second base portions 82*a*, 82*b* of the cladding member 80. Tightening of the plurality of fasteners 94 continues until the guide rail 54*a* is secured attached to the cladding member 80. The attachment of the cladding member 80 to the guide rail 54*a* continues until the cladding member 80 completely covers the base portion 72 of the guide rail 54*a*, as shown in FIG. 11. Used in this way, the cladding members 80 can present an aesthetically pleasing appearance rather than the industrial appearance of the base portion of the guide rails 54*a*.

Referring again to the embodiment shown in FIGS. 8-11, the cladding members 80 are formed from metallic extrusions, the appearance of which can be customized to provide a desired aesthetic appearance and style to the hoistway. It is contemplated that the cladding members 80 can have colorings, coverings, coatings and/or textures that serve to visually compliment the desired ornate appearance of the highlighted technical and functional components of the building. For example, if the desired ornate appearance of the highlighted technical and functional components is best complimented by natural metallic finishes, then the cladding members 80 can be provided with a natural finish or with clear finishes. As another example, if the desired ornate appearance of the highlighted technical and functional components is best complimented by tinting the cladding members 80 with one or more colors, then the cladding members 80 can be provided with any desired coloring or colorings. As yet another example, if the desired ornate appearance of the highlighted technical and functional components is best complimented by a specialized coating, then the cladding members 80 can be provided with any desired coating, such as the non-limiting examples of chrome, nickel or cadmium plating.

Referring again to the embodiment shown in FIG. 8, the first and second side portions 84*a*, 84*b* and the top portion 86 of the cladding members 80 have a substantially smooth surface. The term "smooth surface", as used herein, is defined to mean a continuous, even surface. The smooth surfaces of the first and second side portions 84*a*, 84*b* and the top portion 86 are configured to provide one aesthetic appearance to the cladding member 80. Optionally, the first and second side portions 84*a*, 84*b* and the top portion 86 of the cladding member 80 can be textured. The term "textured", as used herein, is defined to mean having a non-smooth surface characteristic. The textures imparted to the first and second side portions 84*a*, 84*b* and the top portion 86 can provide other desired aesthetic appearances to the cladding member 80. The textures can be formed by any desired structure or combination of structures, including the non-limiting examples of grooves, cross-hatchings or granulations.

Referring again to FIG. 8, the cladding members 80 provide many benefits, although all benefits may not be present in all embodiments. First, the cladding members 80, when attached to the guide rails 54*a*, 54*b*, 58*a*, 58*b* form a very strong structural frame that provides additional structural rigidity to the framework assembly 22. Second, the cladding members 80 facilitate use of industry standard guide rails 54*a*, 54*b*, 58*a*, 58*b*, while presenting an aesthetically appealing finished product. Finally, the cladding members 80 facilitate easy assembly of the framework assembly 22.

While the embodiment illustrated in FIGS. 9-11 illustrate the use of guide rails 54*a*, 54*b*, 58*a*, 58*b* having a "T" cross-sectional shape, it is contemplated that the cladding members 80 can be configured for attachment to guide rails having other cross-sectional shapes.

Figure 12:
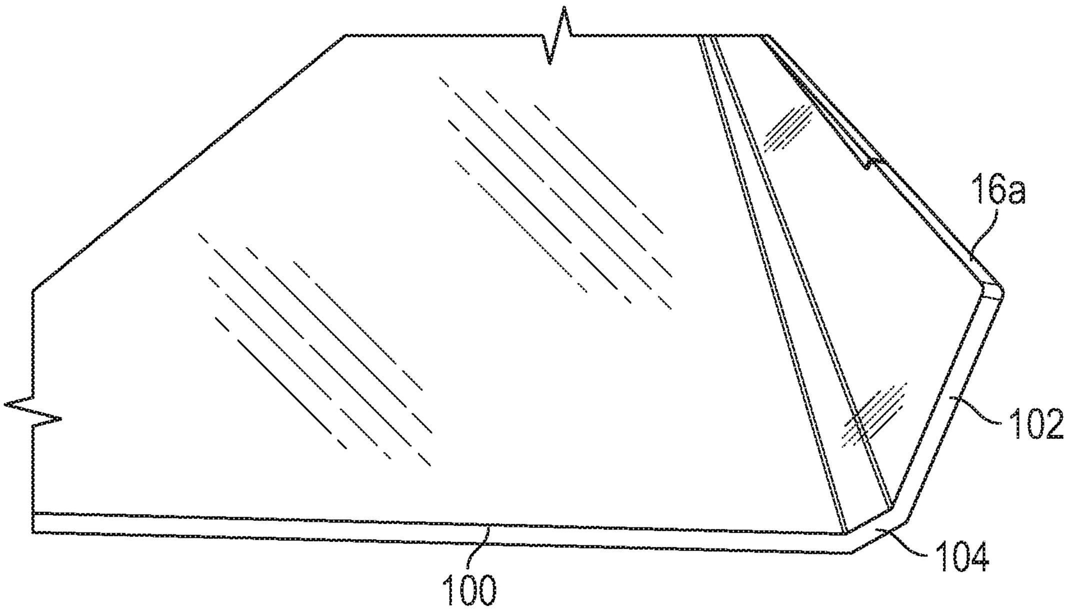
FIG. 12 is a perspective view of a front wall element of the glass elevator car of FIG. 1, illustrating a radiused bend.
Figure 13:
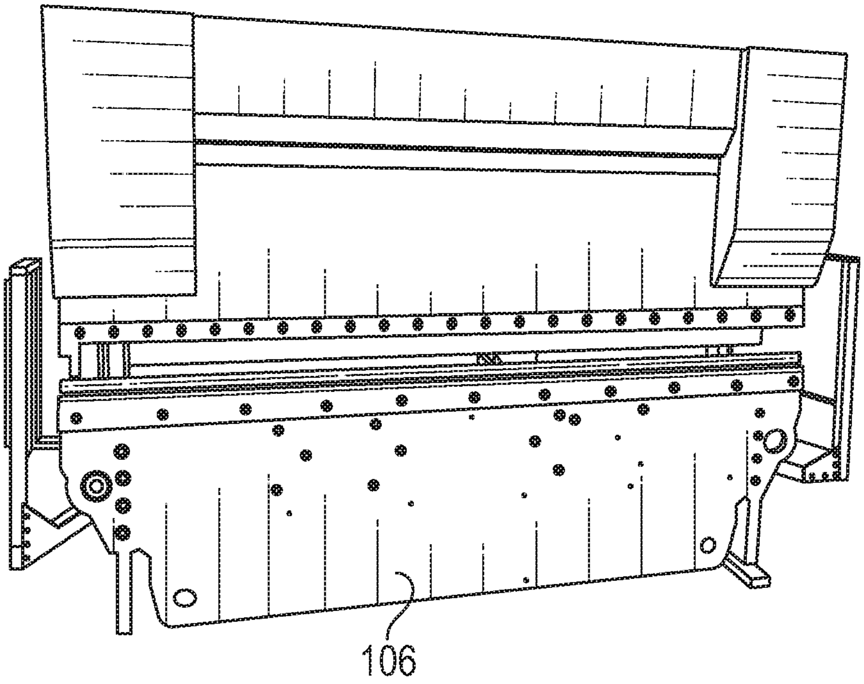
FIG. 13 is a perspective view of a CNC press brake used to form the radiused bend of the front wall element of FIG. 11.

Referring again to FIG. 1 and as previously discussed, the front wall elements 16*a*, 16*b*, opposing side wall elements 18*a*, 18*b* and the rear wall element 20 can be formed from transparent materials, such as the non-limiting example of polymeric materials. In certain instances, it is desirable to form radiused bends, arcuate shapes and/or corners in the transparent materials. Typically, polymeric materials can formed into shapes by processes involving simultaneous applications of heating and bending. However, the thermal forms for these processes can be expensive and limited to forming specific shapes. Referring now to FIG. 12, a front wall element 16*a* is illustrated. The front wall element 16*a* includes a first leg 100, a second leg 102 and a radiused bend 104 therebetween. In this embodiment, the radiused bend 104 is formed by a cold forming process, that is, a non-heat related process. The cold forming process uses a computer numerical control (commonly referred to a "CNC") press brake for creating of custom shapes for materials used in elevator cabs and hoistways. One non-limiting example of a CNC press brake is shown at 106 in FIG. 13. In the illustrated embodiment, the press brake 106 is a Model B120/200, manufactured and marketed by Iroquois Ironworker, Inc., headquartered in Iroquois, South Dakota. However, in other embodiments, other suitable press brakes can be used.

Figure 14A:
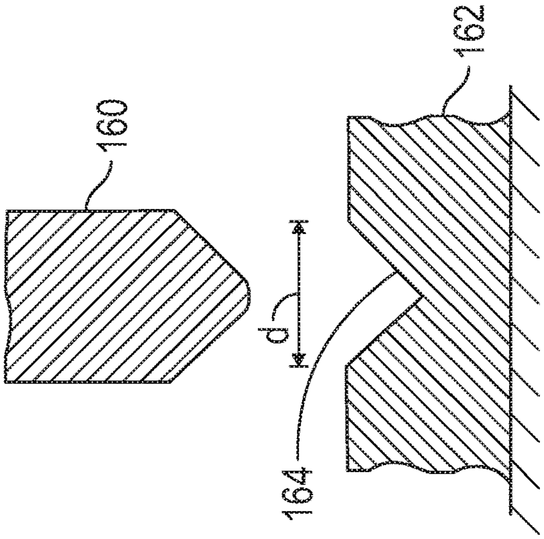
FIG. 14A is a schematic illustration of the punch and a corresponding die of the CNC press brake illustrated in FIG. 13.
Figure 14B:
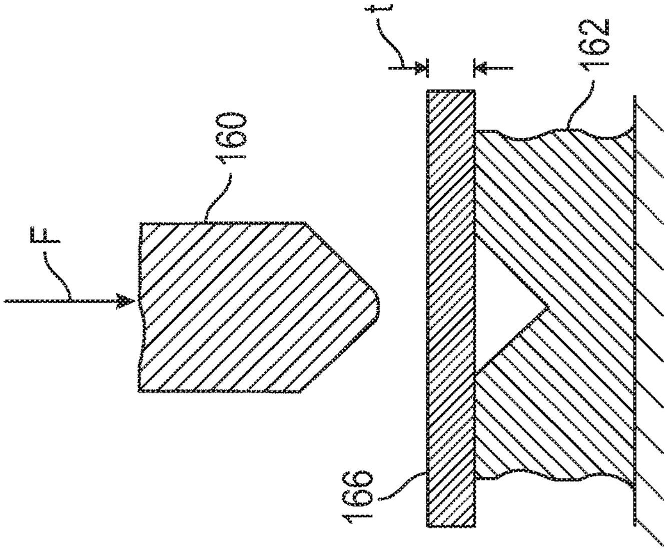
FIG. 14B is a schematic illustration of the punch and a corresponding die of the CNC press brake illustrated in FIG. 13, shown with a material positioned on the die of FIG. 14A.
Figure 14C:
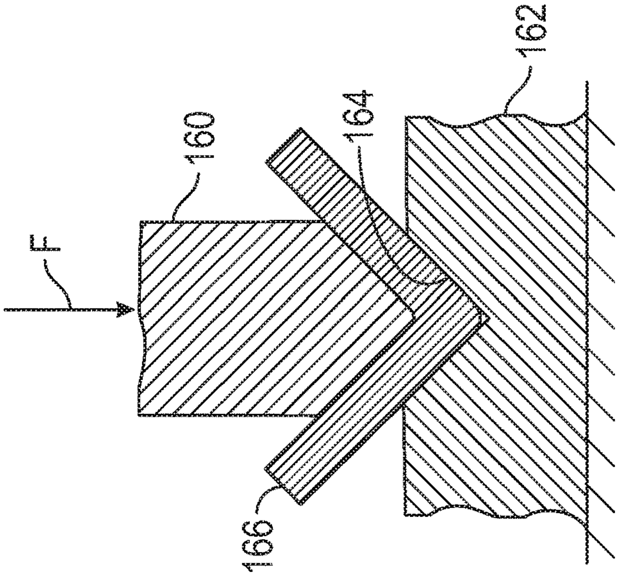
FIG. 14C is a schematic illustration of the punch and a corresponding die of the CNC press brake illustrated in FIG. 13, shown with the punch of FIG. 14A engaging the material of FIG. 14B.

Referring now to FIGS. 14A-14C, the novel process for cold forming the radiused bends used in the front wall elements 16*a*, 16*b*, opposing side wall elements 18*a*, 18*b* and the rear wall element 20 will now be described. In a first step, a suitable punch 160 is matched with a corresponding die 162. The die 162 has an opening 164 with a cross-sectional shape of a V. The opening 144 has a base dimension of d. The base dimension d corresponds to a thickness t of the material 166 to be cold formed. In the illustrated embodiment, the base dimension d is approximately 5-8 times the thickness t of the material 166. In one non-limiting example, the material 166 has a thickness t of about 0.25 inches and the base dimension d of the opening 164 is in a range of from about 1.25 inches to about 2.00 inches. Without being held to the theory, it has been found that linking the base dimension d to about 5-8 times the thickness t of the material 166 advantageously helps prevent cracking of the material 126 during the cold forming process.

Referring now to FIG. 14B in a next step, the material 166 is positioned on the die 162 in a manner such that the intended bend line of the material 166 is aligned with the V. In a next step, force is applied to the punch 160 in an manner such as to move the punch 160 toward the material 166 and the die 162, as indicated by direction arrow F.

Referring now to FIG. 14*c* in a next step, movement of the punch continues until the punch 160 contacts and drives the material 166 into the opening 164 and against the die 162. Once the material 166 is seated against the die 162, the material 166 has been bent into a radiused bend without the use of heat. The force used on the punch 160 depends on the thickness t of the material 166, the dimension d of the opening 164 and the desired inner radius of the formed material 166. In the illustrated embodiment, it has been found that the force can be determined from common press brake tonnage charts as used for sheet metals. However, in other embodiments, other references can be used to determine the required force.

Advantageously, the use of the CNC press brake 106 allows creation of cold forming processes to form custom angles specific to an elevator installation. The use of the CNC press brake 106 provides for easily customizable shapes without costly thermal-related forms, and results in clean and crisp radiused bends 104.

While the embodiments shown in FIGS. 1-4, 5A, 5B, 6-13 and 14A-14C have been described in the context of an elevator having elevator wall elements, floor elements or ceiling elements advantageously cold formed with glass materials or polymeric materials, it is further contemplated that the described innovations can be incorporated into an elevator having elevator wall elements, floor elements or ceiling elements formed with other cold formed materials, such as the non-limiting examples of metal and/or wood.

In accordance with the provisions of the patent statutes, the principle and mode of operation of the innovations for glass elevators have been explained and illustrated in a certain embodiment. However, it must be understood that the innovations for glass elevators may be practiced otherwise than as specifically explained and illustrated without departing from its spirit or scope.

What is claimed is:

1. A framework assembly for use with a glass elevator, the framework assembly comprising:

a plurality of vertically aligned structural rings, each having one or more recesses, each of the recesses extending from an inner edge of the structural ring in a direction toward an outer edge of the structural ring;

a plurality of corner members extending from a lowermost structural ring to an adjacent structural ring; and a plurality of guide rails extending from the lowermost structural ring to the adjacent structural ring, each of the plurality of guide rails having at least one flange configured to support a plurality of faces;

wherein the at least one flange of each of the plurality of guide rails is configured to seat within the one or more recesses of each of the plurality of structural rings;

wherein each of the plurality of structural rings is formed from a unitary, continuous, solid plate material.

2. The framework assembly of claim 1, wherein the unitary, continuous, solid plate material is aluminum or steel.

3. The framework assembly of claim 1, wherein each of the lower and intermediate structural rings have a plurality of corner tabs configured to receive the plurality of corner members.

4. The framework assembly of claim 1, wherein each of the structural rings have a plurality of intermediate tabs configured to receive the plurality of guide rails.

5. The framework assembly of claim 1, wherein the framework assembly has a non-square, non-rectangular, non-circular and non-ovular perimeter shape.

6. The framework assembly of claim 1, wherein each of the structural rings is formed from a plurality of perimeter segments.

7. The framework assembly of claim 6, wherein each of the structural rings is formed from a quantity of five perimeter segments.

8. The framework assembly of claim 6, wherein an aperture is formed within the plurality of perimeter segments.

9. The framework assembly of claim 8, wherein the aperture is configured to facilitate passage of the glass elevator therethrough.

10. The framework assembly of claim 1, wherein each of the structural rings are formed with the same quantity of perimeter segments.

11. The framework assembly of claim 1, wherein each of the structural rings form an aperture therein, and a portion of the plurality of guide rails extends into the apertures formed by each of the structural rings.

12. The framework assembly of claim 1, wherein a plurality of corner members are connected to and extend vertically above each of the structural rings.

13. The framework assembly of claim 1, wherein the plurality of guide rails are connected to and extend vertically above each of the structural rings.

14. The framework assembly of claim 1, wherein a base of each of the plurality of guide rails is covered by an associated cladding member.

15. The framework assembly of claim 14, wherein each of the cladding members has a first base portion, a first side portion extending from the first base portion, a second base portion opposing the first base portion, a second side portion extending from the second base portion, a top portion extending from the first side portion to the second side portion, a cavity formed by the first and second base portions, first and second side portions and the top portion, the cavity configured to receive a portion of each of the plurality of guide rails.

16. The framework assembly of claim 15, wherein the opposing first and second base portions form a slot, the slot is configured to receive a portion of each of the plurality of guide rails.

* * * * *